Dec. 6, 1960 O. B. STRAM 2,963,689
INPUT BUFFER FOR A MAGNETIC STEP COUNTER
Filed July 30, 1958
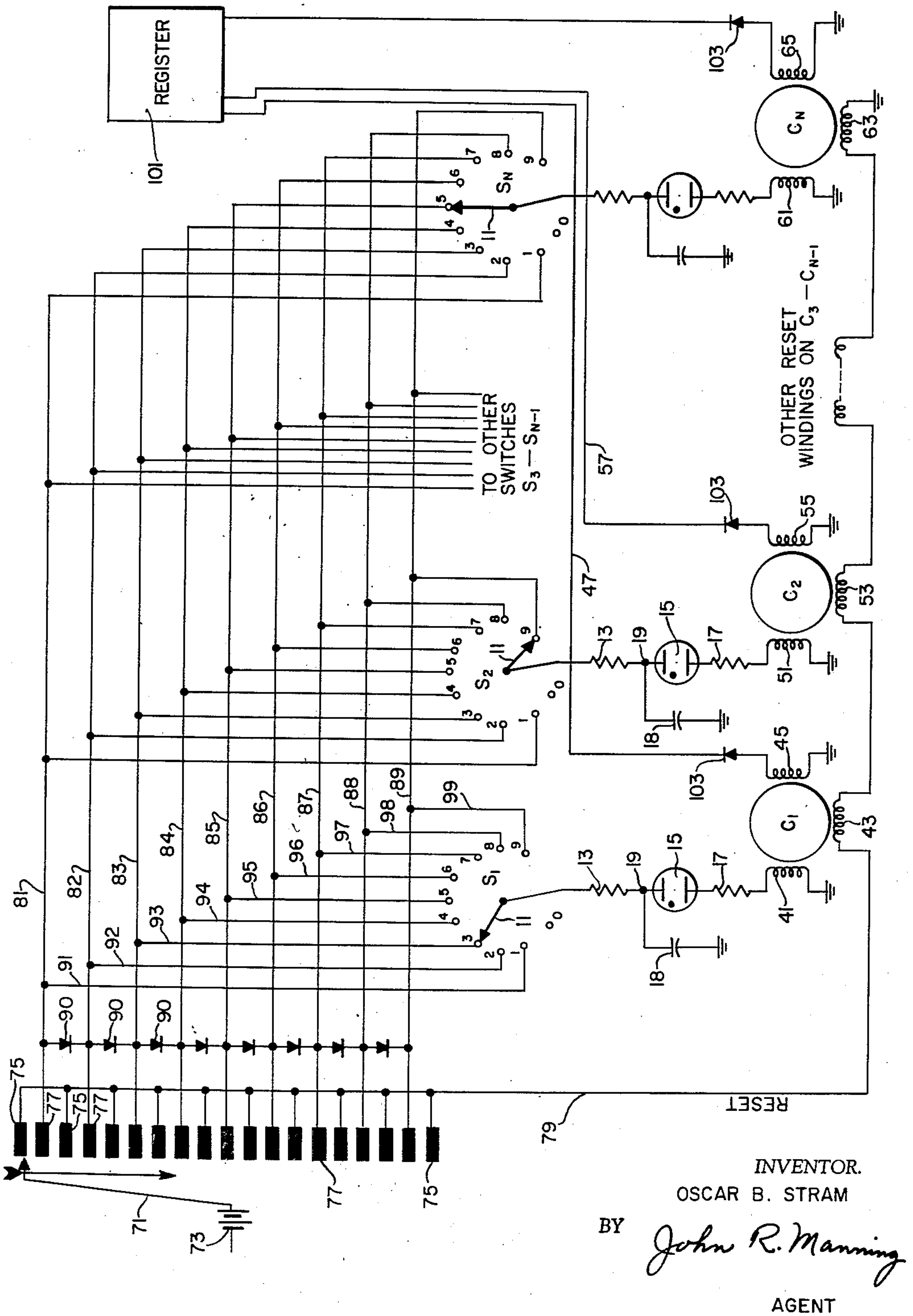
INVENTOR.
OSCAR B. STRAM
BY John R. Manning
AGENT United States Patent Office 2,963,689
Patented Dec. 6, 1960

2,963,689

INPUT BUFFER FOR A MAGNETIC STEP COUNTER

Oscar B. Stram, Paoli, Pa., assignor to Burroughs Corporation, Detroit, Mich., a corporation of Michigan Filed July 30, 1958, Ser. No. 751,950

12 Claims. (Cl. 340—174)

This invention pertains to input buffer means for a magnetic step counter and, more specifically, to maintaining a proper pulse to shift the magnetic cores of the system.

The invention relates to the translation of data contained in decimal switches to a register which may be a shifting register, an accumulator, flip-flop, or the like.

Magnetic cores are an integral part of the invention and their operation, although well known in the art, will be explained by a brief description. The magnetic cores are characterized by having two stable states, i.e., they are capable of magnetic saturation in either of two directions. After such magnetization, the remanent flux in the core has the maximum possible value in either direction, and this maximum value is referred to as the retentivity of the magnetic core. Normally, the magnitude of the retentivity is the same in either direction.

For the purpose of this discussion, we shall call one stable state the "set" state and the other stable state the "reset" state. The direction of retentiviy is opposite in the "set" state from the "reset" state. The different stable states may be obtained by passing suitable currents through the proper windings of the core.

When the core is in the same magnetic remanence state as that tended to be established by a current in a winding and the ensuing read-out flux, very low output voltage is induced in the output winding of the core. Conversely, when the state of flux is reversed, a high change of flux is presented and, accordingly, a large output potential is induced in the windings about the core.

The cores usually take the form of small toroids, although other physical arrangements of magnet elements may be employed. The preferred hysteresis characteristic for magnetic material of which these cores are made is rectangular. Accordingly, to drive a core from the "set" to the "reset" state, or vice versa, there is a definite minimum or critical magnetomotive force required and if the minimum force is not reached, the state of the core remains about the same as before the force was applied. Less than this magnetomotive force can provide some excursion of the core, however. It is this excursion or partial shifting of the direction of polarization of the core that has been found to cause certain malfunctions in the setting and read-out of the magnetic cores. This excursion is known to be caused by "switch jitter," that is, the production of spurious signals. Therefore, it is an object of this invention to insure that the input pulse to set the magnetic core or element has the proper wave form to switch the core or element in spite of switch jitter.

It is another object of this invention to provide a circuit wherein the current pulse to set the magnetic cores depends on circuit elements other than switch contacts.

It is a further object of this invention to provide a circuit wherein the switching of each core is independent of the switching of the other cores.

It is a still further object of this invention to greatly reduce the amplitude of the maximum current necessary to set the magnetic cores.

It is an additional object of this invention to provide a circuit wherein the switching of a particular magnetic core in no way affects the state or switching of other cores in the circuit.

It is a further additional object of this invention to improve the reliability and simplify the operation of core switching circuits.

The invention comprises means to increase the reliability of the translation of data from decimal switches, which may be set by mechanical means such as the add racks of a business machine, to a binary code which may be inserted into a register. It has been found that at times large currents are necessary to "set" or "reset" the cores. Printed circuit type switches are used and the large current through a relatively light printed circuit conductor causes burning and the products of burning collect on the edges of any of the switch contacts that must conduct the large current. The products of burning which have been deposited on the switch contacts and conductors produce switch jitter which results in the production of spurious pulses of various amplitudes and duration. If the first jitter pulse does not fully set the core and more than one such pulse is produced in setting, an error may result. The products of burning which collect at the leading edges of the switch segments and conductors produce low current pulses of a very short duration preceding the actual set pulse, and so cause partial setting of the magnetic cores. The invention comprehends the use of a resistance-capacitance integrating circuit and an element that is non-conductive at low voltages in the output line from each decimal switch to obviate the effects of spurious pulses which are produced as a result of switch jitter.

These and other objects of the invention will become more apparent by reference to the ensuing description and the accompanying drawing in which:

The figure is a circuit diagram showing the incorporation of the invention into the circuit.

Reference will now be made to the figure wherein the circuit diagram incorporating the invention is disclosed in schematic form. There is shown a scanner-wiper arm 71 having a source of potential 73 applied thereto. The scanner-wiper arm 71 is made to traverse a plurality of the contacts 75 and 77 in circuit with the magnetic cores $C_1$, $C_2$, $C_3$—$C_{N-1}$, and $C_N$. The "reset" contacts 75 are alternately interspersed with the "set" contacts 77.

The reset contacts 75 are wired together and communicate with the windings 43, 53 and 63 on the cores through the conductor 79. The set contacts 77 communicate with the decimal switches $S_1$, $S_2$, $S_3$—$S_{N-1}$, and $S_N$ through the conductors 81–89. Connected between each conductor 81–89 is a diode 90.

Referring now to the decimal switches $S_1$, $S_2$, $S_3$—$S_{N-1}$, and $S_N$, the specific operation of the decimal switch $S_1$ only will be explained as the operation of this switch is similar to the other decimal switches. There is shown communicating with the conductors 81–89 the conductors 91–99 (i.e., the conductor 81 connects with the conductor 91, the conductor 82 connects with the conductor 92, etc.) which, in turn, lead to the contacts 1–9 of the decimal switch $S_1$. The decimal switch $S_1$ is shown having a rotatable contact arm 11 adapted to engage the contacts 0–9 of the decimal switch $S_1$. In series with the contact arm 11 of the decimal switch $S_1$ is the resistor 13, the neon tube 15, the resistor 17, a winding 41 about the magnetic core $C_1$, and thence to ground. A capacitor 18 is shown as having one of its leads connected at the junction of the resistor 13 and the neon tube 15 and its other lead connected to ground.

The circuit is shown as having an output winding 45 about the core $C_1$ which is adapted to be energized by any flux reversal in the core $C_1$. The output winding 45 is shown as communicating with the register 101 through the conductor 47. The diode 103 in the line 47 will inhibit pulse passage when the cores are reset. The register 101 may take a form such as an accumulator, a sh'ft register, magnetic drum storage, or other storage means.

As stated previously, the circuit connections of the decimal switches $S_2$, $S_3$—$S_{N-1}$, and $S_N$ are the same as those described for the first line of circuitry and no explanation is, therefore, deemed necessary.

Referring now to the figure, the operation of the circuit will be described. As the scanner-wiper arm 71, having the potential 73 applied thereto, progresses downwardly, it successively engages the contacts 75 and 77. As the first contact 75 is pulsed, a pulse is caused to traverse the conductor 79 and passes through the windings 43, 53, other reset windings of cores not shown, and the winding 63 which are on the magnetic cores. As a result of the pass'ng of this current through these windings, the cores will be placed in their reset state if not already in that state.

As the scanner-wiper arm 71 progresses, it next engages the first of the set contacts 77. The pulse is applied thereto and will pass through the winding 41 on the core $C_1$ if the circu'try permits. In this instance, the pulse will pass from the first contact 77 through the diodes 90 until it reaches the conductor 83. On the conductor 83, the pulse will pass down the conductor 93 and a circuit is completed since the rotatable contact arm 11 of the switch $S_1$ is resting upon the No. 3 contact of the switch $S_1$. The pulse will charge the RC circuit 13, 18 and will not cause conduction of the neon tube 15 until the firing voltage of the neon tube 15 appears at the point 19. The tube 15 does not conduct until the capacitor 18 has charged to about 130 volts (in the case of a NE 96 tube) and after firing, the drop across the tube 15 reduces to a constant 70 volts. This differential voltage of about 60 volts is, consequently, transmitted to the core w'nding 41 as a steeply rising pulse, causing it to switch in the optimum manner. As stated above, the neon tube 15 will now conduct and the circuit is completed to ground through the resistor 17 and the winding 41 about the core $C_1$. As the core $C_1$ is in its reset state and the pulse that just arrived through the w'nding 41 is in such a direction to cause the core $C_1$ to assume its set state, an output voltage is induced in the output winding 45. The pulse induced in the winding 45 is communicated to the register 101 through the conductor 47 where it is recorded and ut'lized in whatever means desired.

There is a circuit path from the first set contact 77 through the diodes 90 to the conductor 89 and then to the contact 9 of the switch $S_2$. Similar charging of the RC circuit obtains and when the voltage at the point 19 reaches a predeterm'ned value, conduction of the tube 15 ensues and the differential voltage (firing voltage of the tube 15 minus the conducting voltage) appears across the winding 51 causing the transition of the magnetic core $C_2$ from its reset to its set state and inducing a voltage in the output winding 55 which communicates with the register 101 through the conductor 57.

As a result of this explanation, it may be seen that circuit paths are also complete to all switches whose rotatable contact arms are not on the 0 contact.

As the scanner-wiper arm 71 progresses, it next engages the second reset contact 75. A pulse is caused to pass through the reset windings of all the cores and places them in the reset condition if they have been placed in the set condition due to receiving a pulse through any of the windings 41, 51, or 61.

Next, the scanner-wiper arm 71 engages the second set contact 77 and a circuit exists through all decimal sw'tches whose rotatable contact arms 11 are on contacts 2 or greater.

This sequence continues until the scanner-wiper arm 71 reaches the last reset contact 75, at which time it is returned to the first reset contact 75 to await the resetting of the decimal switches and the subsequent readout of the values stored in the decimal switches.

As shown in the circuit, a condition may exist wherein 12 magnetic cores must be set in parallel in the case of a 12 demical switch or channel read-out. The current required to pass through the scanner-wiper arm 71 under these conditions is very great. It is obvious that all the cores will not switch in exactly the same time and that once switched, the "impedance" of the core is very low. Supposing that at a given instance in the pulse, eleven of the cores have switched and now have a very low impedance while the twelfth core is still in the process of switching and has a high impedance, the scanner-wiper arm 71 must be able to supply enough current to maintain the driving current through the twelfth core which may be as high as 800 milliamperes. This large current through a relatively light printed circuit type of switch causes burning, and the products of burning collect on the leading edges of the contact segments and produce switch jitter.

Switch j tter, as defined above, is caused by the engagement of the contact with the products of burning, and as a result thereof spurious pulses are caused to pass through set or reset windings of the magnetic cores. These spurious pulses must not pass through the windings of the core or errors may be obtained as a result of partial or incomplete excursions of the direct'on of magnetization of the magnetic core. This invention deals mainly with the elimination of the spur'ous pulses from the magnetic core windings by the addition of an integrating and voltage-delay conducting circuit. The pulse d stributing means embodied in the scanner switch (elements 71, 75 and 77), the diodes 90, and the decimal switches ($S_1$ through $S_N$) are used only as example and it is understood that any system of switches may be used. As herein described, pulses will not reach the set winding of the magnetic core until the conduction of the neon tube commences. After the conduction of the neon tube, spur'ous pulses no longer emanate from the switching process and, therefore, can no longer introduce errors into the system.

In the input buffer for a magnetic step counter constructed the value used for the resistor 13 was 20K ohms, the neon tube 15 was a NE–96, the resistor 17 had a value of 2K ohms and the capacitor 18 was given a value of .01 microfarad. The values of the components are given only for illustrative purposes and it is understood that the invention is not to be limited to these values. It is also evident from the disclosure, to anyone skilled in the art, that various c'rcuit changes may be effected and still be within the realm of the invention. Using the values of the resistor-capacitor integrating circuit g'ven above, a time constant is approximately 400 microseconds, i.e., the time necessary to charge the capacitor 18 to the firing voltage of the neon tube 15 which is approximately 130 volts. The voltage necessary to maintain conduction of the neon tube 15 is approximately 70 volts, and when the neon tube 15 fires (conducts), the differential voltage (130 volts minus 70 volts) appears across the winding 41 of the magnetic core to switch the core in the optimum manner if it has previously been switched by current passing through the winding 43.

I claim:

1. A circuit for producing pulses to shift a bistable magnetic core from a first stable state to a second stable state comprising a winding on said core, a gaseous electron tube in series with said winding, a resistor-capacitor integrating network in circuit with said tube, and means to charge said integrating network to the conduction potential of said tube and thereby produce conduction of the tube.

2. In a system for the translation of data from decimal code to binary code the combination comprising, a switching means having a plurality of contacts sequentially engageable by a wiper arm, means to energize the contacts of said switching means, a charging circuit connected to said wiper arm for receiving a voltage charge from said energizing means a bistable magnetic core having a plurality of windings thereon, a gaseous electron tube in series with one of said windings and said wiper arm, a binary register in circuit with at least one other of said windings, and means to transfer a count to said register upon a shifting of said core from a first stable state to a second stable state actuated by said charging circuit.

3. The combination as defined in claim 2 wherein said charging circuit is a resistor-capacitor integrating network which inhibits conduction of the tube until a desired potential is reached.

4. The combination as defined in claim 3 wherein said gaseous electron tube has a large differential between its firing potential and its conducting potential.

5. The combination as defined in claim 2 wherein means is provided for passing current through one of said windings on said magnetic core for resetting the core to its first stable state.

6. In a circuit for reducing switch jitter the combination comprising a source of power, a gaseous electron tube having a large differential between its firing potential and conducting potential, a bistable magnetic core having at least a set winding, a reset winding and an output winding, switching means in series with said tube and one of said windings on the magnetic core, means in circuit with said tube to inhibit conduction until a predetermined voltage level is reached, a binary register in circuit with the output winding of said magnetic core, means to actuate said binary register by the coupling of said power source to the switching means of said series circuit thereby passing a current therethrough and inducing a voltage in said output winding, and means to reset said core by the coupling of said power source to said reset winding.

7. In a system for maintaining a proper pulse to shift the magnetic cores of a magnetic step counter, the combination comprising a plurality of bistable magnetic cores, each having at least an input winding, an output winding and a reset winding, a first switching means and a plurality of second switching means, said second switching means having a plurality of contacts engageable by an externally mechanically actuable wiper arm, said first switching means having alternate contacts communicating with the contacts of said second switching means and with the reset windings of the magnetic cores, diodes connected between the contacts of the first switching means which communicate with the second switching means, a gaseous electron tube in series with each of said second switching means and said input winding on said magnetic cores, each said tube having a large differential between its firing potential and its conducting potential, a resistor-capacitor integrating network in circuit with each said tube capable of discharging and causing conduction of said tube at a predetermined time, a storage register and a blocking diode in circuit with said output windings, and means to progressively energize the contacts of the first switching means to transfer a count to said register by shifting said core from a first stable state to a second stable state after actuation of the wiper arms of the second switching means.

8. A magnetic storage device comprising, a bistable magnetic core, a winding on said core, a gaseous electron tube in series with said winding, a charging network in circuit with said tube, and means to charge said charging network to produce conduction of said tube and switching of said core from one stable state to its other stable state.

9. The combination as defined in claim 8 wherein said charging network is a resistor-capacitor integrating network.

10. A magnetic storage device comprising, a bistable magnetic core, a winding on said core, a gaseous electron tube in series with said winding and having a conduction threshold, a charging network in circuit with said tube, and means to charge said charging network to the conduction threshold of said tube to produce conduction of said tube and switching of said core from one stable state to its other stable state.

11. The combination as defined in claim 10 wherein said gaseous electron tube is a neon tube and said charging network is a resistor-capacitor integrating network.

12. A magnetic storage device comprising, a bistable magnetic core, a winding on said core, a resistor and a gaseous electron tube in series with said winding, said gaseous electron tube having a conduction threshold, a capacitor coupled between said resistor and said tube, and means to charge said capacitor through said resistor to the conduction potential of said tube to produce switching of said core from one stable state to its other stable state.

References Cited in the file of this patent

UNITED STATES PATENTS

| | | |
|---|---|---|
| 2,770,739 | Grayson | Nov. 13, 1956 |
| 2,851,677 | Crooks | Sept. 9, 1958 |